United States Patent Office 3,415,661
Patented Dec. 10, 1968

3,415,661
COATING COMPOSITION AND HEAT-SEALABLE
COATED POLYSTYRENE ARTICLE
Thomas F. Sincock, Simsbury, Conn., assignor to
Monsanto Company, St. Louis, Mo., a corporation
of Delaware
No Drawing. Filed Nov. 5, 1963, Ser. No. 321,429
6 Claims. (Cl. 99—171)

ABSTRACT OF THE DISCLOSURE

A coating composition for rendering polystyrene heat sealable, antifogging and antistatic comprising a mixture of ethoxylated sorbitan monostearate and ethoxylated sorbitan tristearate.

---

This invention relates to an anti-fogging composition for polystyrene articles. More particularly the invention relates to an antifogging composition for biaxially oriented polystyrene pellicles and to the transparent coated pellicles obtained therewith which are capable of forming tenacious heat-sealable bonds and are static-free and nonfogging.

Because of its transparency polystyrene film is used as a packaging material, either by itself or to provide windows in cartons. For instance, it can be used to package moisture-containing foodstuffs such as vegetables, fruit, fresh meat, bacon, sausages, etc. However, while ordinary polystyrene film effectively protects the contents from outside contamination, it is subject to an important disadvantage when used to wrap moisture-containing products in that it tends to become fogged with small droplets of water when the environmental temperature of the package drops sufficiently to cause condensation of moisture on the inner surface of the wrapping material. The formation of fog or droplets in such cases is attributed to the hydrophobic surface quality of the wrapping material, and represents a substantial sales disadvantage in that it mars the appearance of the package and decreases its utility by preventing a potential purchaser from viewing the contents. Further, due to the electrostatic forces which are built into the ordinary transparent polystyrene article in processing, such an article is subject to the attraction of dirt and dust particles which detract from its gloss, clarity and transparency. The ordinary transparent polystyrene pellicle material also suffers an economic disadvantage in that it is incapable of readily forming a heat-sealable bond of sufficient strength. This is an especially pronounced disability in the case of heavy gauge material, e.g., material having a thickness of about 3 mils or more.

In the past various coating compositions have been proposed for hydrophobic transparent films in order to impart non-fogging or heat-sealing properties, or both, and to cause rapid dissipation of static charge. However, particularly in the case of polystyrene pellicles progress has been slow. For instance, compositions based principally on certain surface-active sulfated or sulfonated organic materials have been found fairly effective for reducing the fogging and eliminating static but they have not been widely accepted because, when applied to pellicular polystyrene, they tend to increase excessively the surface slip of the pellicle and thus create handling problems after the treated material is wound on rolls. Many coating compositions do not adhere to the pellicle with the required tenacity, and sometimes impair the transparency which the nonfogging composition was designed to maintain. It has also been found that such coatings, because of their properties such as wettability, greasiness, and lubricity, may tend to form an interfering layer between two pellicles of the polystyrene, thereby preventing a satisfactory heat-seal and thus restricting the utility of the coated material as a wrapping.

To be suitable as a heat seal for polystyrene, a coating compound must contain in its molecular structure a lipophilic moiety which is an active solvent for the polymer to be sealed whereas to impart a satisfactory antistatic and antifogging surface coating the compound must be a hard solid which contains hydrophilic groups but, for ease of application, should be soluble in aliphatic solvents. Since he lipophilic and the hydrophilic groups are essentially antagonistic to each other, a very delicate balance between the two is required if all of the desired properties are to be achieved. Especially when the requirement for a hard solid is added, it is apparent that only very few materials are even potential candidates for the job, and of these many must be ruled out because of their various incidental effects or actual shortcomings in performance. Consequently, it is not surprising that success in this exacting field of endeavor has been very limited.

It is an object of the invention to provide a coating composition for rendering pellicular polystyrene material nonfogging and antistatic. It is a further object of the invention to provide a composition for rendering biaxially oriented polystyrene pellicles nonfogging and antistatic as well as capable of forming heat-sealable bonds, without impairment of clarity in the final product. It is a further object of the invention to provide a nonfogging, antistatic and heat-sealable polystyrene pellicle, and especially to provide such a pellicle without impairment of its original clarity. It is still a further object of the invention to provide an improvement in packaging moisture-containing foodstuffs or other materials in containers or envelopes comprising transparent biaxially oriented pellicular polystyrene. An additional object of the invention is to provide an improved process for rendering biaxially oriented polystyrene pellicles nonfogging, antistatic and heat-sealable. These and other objects, as well as the scope, nature and utilization of the invention will become more clearly apparent from the following description and appended claims.

It should be understood that the term "pellicle" is used in this description to refer both to thin gauge film of up to about 3 mil in thickness and to sheets having a thickness of more than 3 mils. It should also be understood that, in the absence of contrary indications, all proportions of materials are expressed herein on a weight basis.

It has now been discovered that an improved heat-sealable, antistatic and nonfogging polystyrene pellicle of satisfactory clarity is produced by coating the pellicular material with a novel coating composition which comprises ethoxylated sorbitan monostearate and ethoxylated sorbitan tristearate dissolved in suitable proportions in a suitable solvent.

The essential nonvolatile component of the coating composition is a proper combination or mixture of (a) sorbitan monostearate condensed with with about 2 to 10 moles, preferably about 3 to 7 moles, of ethylene oxide and (b) sorbitan tristearate condensed with about 15 to 25 moles, preferably about 18 to 22 moles, of ethylene oxide. The condensation products may be formed by standard procedures and are commercially available, "Tween 61" being an example of a suitable tetraethoxylated sorbitan monostearate and "Tween 65" being an example of a sorbitan tristearate condensed with an average of about 20 ethylene oxide groups per molecule. A mixture of suitable components (a) and (b) as just described should desirably be characterized by a hydrophilic-lipophilic balance ("HLB") of 10±2, as this term is defined in the literature. See, for example, the booklet entitled "The Atlas HLB System," LD–97–10M–9–62, Copyright 1962, Atlas Chemical Industries, Inc.

The pellicular material for which this coating composition is particularly useful is biaxially oriented film or sheet made of resinous polystyrene or polymerized alpha-methylstyrene or of similar known styrene resins which contain a major proportion, e.g., 50 to 98% of combined styrene copolymerized with a minor proportion, e.g., 50 to 2% of at least one suitable ethylenically unsaturated compound such as acrylonitrile, methacrylonitrile, an alkyl methacrylate such as methyl methacrylate, and/or a conjugated diolefin of 4 to 6 carbon atoms such as butadiene-1,3. However, the diolefin should not be combined in the copolymer in a concentration in excess of about 35%, and preferably not in excess of about 25%, unless it is desired to have an elastomeric product. Instead of a single resin, a resin blend may also be used, e.g., a high impact blend containing polystyrene admixed with a butadiene-styrene copolymer in an otherwise well-known manner. The term "biaxially oriented" is used herein to refer to pellicular material which has been cold drawn along each of its two principal axes to at least 150% of its original length, e.g., 200 to 400 of its original unstretched length. The unoriented material is of very limited utility as a packaging material. If at least one of the two pellicles to be sealed is coated in accordance with the present invention and has a thickness not in excess of about 3 mils, excellent heat seals are obtained regardless whether the other pellicle is like the first one or is thicker, or is an uncoated sheet of polystyrene.

Suitable ranges for the nonvolatile components, expressed in weight percent based on a total weight of said components, are as follows: (1) about 25 to 75 percent, preferably 40 to 60 percent, of a condensation product formed by condensing about 2 to 10 moles, preferably about 4 moles, of ethylene oxide with each one mole of sorbitan monostearate, and (2) about 25 to 75 percent, preferably 40 to 60 percent, of a condensation product formed by condensing about 15 to 25 moles, preferably about 20 moles, of ethylene oxide with each one mole of sorbitan tristearate. A particularly good formula comprises approximately 50 percent of each of the two condensation products. When heat sealability is not required, or when it is supplied by another film which has been coated as just described, an outstanding hard antifogging and antistatic surface can be obtained by using the aforementioned ethoxylated sorbitan monostearate without any of the tristearate.

In order to form the coating composition appropriate quantities of the two condensation products forming the nonvolatile portion are dissolved in a solvent which does not attack biaxially oriented polystyrene. The two ethoxylated sorbitan stearates should desirably be present in the resulting solution in a total concentration range of about 0.1 to 10 percent, preferably in a concentration of about 1 to 2 percent. Suitable solvents include individual liquid alkanes having 5 to 8 carbon atoms and mixtures thereof, n-hexane and n-heptane being preferred. Suitable non-alkane solvents include alkanols of 1 to 6 carbon atoms such as methanol, sec-butanol and n-hexanol. Mixtures of the alkanes with the alkanols or with minor amounts of still other solvents such as ketones or esters can also be used. A very satisfactory solvent, for instance, comprises 75% n-hexane and 25% isopropanol.

After the nonvolatile components are dissolved in the solvent, the resulting coating composition is applied to the pellicular polystyrene by any conventional coating method, such as by rotogravure, and allowed to dry. The quantity of the coating applied may be such that the dry coating weight after evaporation of solvent is from about 10 to 100 micrograms per square inch, depending somewhat on the particular coating machine or device employed. The optimum dry coating weight has been found to be about 25 to 50 micrograms per square inch.

The uses and advantages of the present invention are further illustrated by the following example. It should be understood, however, that the invention is not limited to the specific details set forth therein.

Example 1

The coating composition was formed by dissolving in 1980 grams of n-heptane 10 grams of a commercial condensation product formed by condensing about 4 moles of ethylene oxide with each one mole of sorbitan monostearate (hereinafter referred to as "SMEO"), and 10 grams of a commercial condensation product formed by condensing about 20 moles of ethylene oxide with each one mole of sorbitan tristearate (hereinafter referred to as "STEO").

The resulting 1% solution was applied to one surface of a sheet of transparent biaxially oriented polystyrene having a thickness of 1 mil (0.001 inch) by means of a rotogravure coater, and dried so that the coated sheet or film possessed a dry coating weight of from 25 to 50 micrograms per square inch. The transparency of the polystyrene film was unaltered by the coating thus applied. A sample of the coated polystyrene sheet material was stored in roll form for one month at an elevated temperature of 120° F. with do diminution in transparency or other properties.

In order to test the antifogging properties the coated film was stretched over a beaker of water and exposed to 30-minute cycles of 40° F. followed by 1 hour at 73° F. The film coated in accordance with the present invention easily survived three alternating refrigeration cycles without the formation of fog or liquid droplets on its surface. Control samples of uncoated polystyrene film were heavily fogged or covered with tiny droplets after 5 minutes at 40° F.

The heat sealing properties were tested with the coated product being heat sealed coated side to coated side, and coated side to uncoated side. The heat seal was formed at 245° F. under 10 p.s.i. of pressure for a dwell period of two seconds. The heat seals were then tested and found to possess a seal strength of 82 grams per square inch when sealed coated side to coated side, and 109 grams per square inch when sealed coated side to uncoated side. A control sample of uncoated polystyrene film was given the same heat sealing treatment and it was found upon testing that a heat seal of only 35 grams per square inch was produced.

While optimum results are obtained when the coating composition comprises a nonvolatile portion of about 50 percent sorbiton monostearate condensed with 4 moles of ethylene oxide and about 50 percent sorbitan tristearate condensed with 20 moles of ethylene oxide, satisfactory results may also be obtained when different proportions of these components are present. This is shown by the results reproduced in Table I.

TABLE I

| Proportions of ingredients | | Properties of coating | | |
|---|---|---|---|---|
| Wt. percent "SMEO" | Wt. percent "STEO" | Heat-seal | Antifog | Non-blocking |
| 100 | 0 | Slight | Good | Good. |
| 75 | 25 | Fair | do | Do. |
| 50 | 50 | Good | do | Do. |
| 25 | 75 | do | do | Fair. |
| 0 | 100 | do | do | Poor. |

From this table it can be seen that good anti-fog properties, as well as satisfactory heat seal and transparency properties are present if the weight ratio of the two nonvolatile components in the coating is between 1:3 and 3:1, preferably between about 1:2 and 2:1. The heat seal bond formed when the nonvolatile portion is about 75 percent "SMEO" possesses a heat seal strength of approximately 20 grams per square inch, and is satisfactory for all except the most severe wrapping applications in which the bond must withstand severe bending and stretching movements. When the combination of the two condensation products making up the nonvolatile component much exceeds about 75 percent by weight of either condensation product then at least one of the two desirable properties, i.e., heat-sealability and blocking, becomes unacceptable.

The antistatic properties imparted to representative polystyrene film and sheet samples were tested after coating them with solutions containing 1% SMEO, or 0.5% SMEO plus 0.5% STEO, in a solvent comprising 3 parts n-hexane and 1 part isopropanol. In carrying out these tests, the coating solution was applied in a conventional way as specified in Table II and, after drying, each film or sheet sample was rubbed ten times with a paper towel to induce a static charge therein. Thereafter the decay of the induced charge was measured at intervals by means of a Keithley Model 600 A electrometer.

The data obtained are summarized in Table II below.

TABLE II

| | Control | Test No. 1 | 2 | 3 | 4 |
|---|---|---|---|---|---|
| Base film thickness, mil | 5.0 | 1.0 | 10.0 | 1.0 | 5.0. |
| Coating | None | 100% SMEO | 100% SMEO | 50% SMEO, 50% STEO. | 50% SMEO, 50% STEO. |
| How coated | | Q 200 rotogravure. | 3 Mayer bar | Q 200 rotogravure. | Q 200 rotogravure. |
| Charge, volts: | | | | | |
| At time zero | 450 | 45 | 30 | 75 | 45. |
| At 5.0 min | 450 | 20 | 15 | 30 | 30. |
| At 30.0 min | 420 | 0 | 0 | 0 | 0. |

The data show that in the uncoated control sample an initial charge of 450 volts was induced, which barely decayed to 420 volts at the end of 30 minutes. By contrast, in the coated samples the highest initial charge induced was only 75 volts and in each instance the initial charge was readily and completely dissipated in less than 30 minutes. Differences in base film thickness as well as in the specific composition of the ethoxylated sorbitan stearate coating used had only a minor effect on the antistatic qualities produced though, as shown in Table I, the choice of proper coating composition is essential for the production of good heat seals. Sorbitan, it will be understood, is a common name for monoanhydrosorbitol, $$C_6H_8O(OH)_4$$

i.e., a cyclic ether tetrahydric alcohol. It is derivable from sorbitol by the removal of one molecule of water. A typical commercial variety thereof is a crystalline product having a melting point of 110° C. and a boiling point of about 225° to 250° C.

Having thus fully described my invention, what I claim is:

1. A heat-sealing, antistatic, nonfogging transparent biaxially oriented polystyrene pellicle bearing on at least one side thereof a dry coating in a weight of about 10 to 100 micrograms per square inch, said coating consisting essentially of about 25 to 75 percent of a condensation product formed by condensing about 2 to 10 moles of ethylene oxide with one mole of sorbitan monostearate, and about 25 to 75 percent of a condensation product formed by condensing about 15 to 25 moles of ethylene oxide with one mole of sorbitan tristearate.

2. A container comprising a transparent film of biaxially oriented polystyrene coated in accordance with claim 1.

3. A heat-sealing, nonfogging, antistatic transparent biaxially oriented polystyrene pellicle bearing on at least one side thereof a dry coating in a weight of about 25 to 50 micrograms per square inch, said coating consisting essentially of about 25 to 75 percent of a condensation product formed by condensing about 3 to 7 moles of ethylene oxide with one mole of sorbitan monostearate, and about 25 to 75 percent of a condensation product formed by condensing about 18 to 22 moles of ethylene oxide with one mole of sorbitan tristearate.

4. A heat-sealing, nonfogging, antistatic transparent biaxially oriented polystyrene film having applied to at least one side thereof a coating in a thickness of about 25 to 50 micrograms per square inch, said coating consisting essentially of about 50 percent of a condensation product formed by condensing about 4 moles of ethylene oxide with one mole of sorbitan monostearate, and about 50 percent of a condensation product formed by condensing about 20 moles of ethylene oxide with one mole of sorbitan tristearate.

5. As an article of manufacture, a moisture-containing foodstuff enclosed in a packaging material comprising a transparent biaxially oriented polystyrene pellicle having applied to at least the inner surface thereof a hard solid coating in a thickness of about 25 to 50 micrograms per square inch, said coating consisting essentially of about 40 to 60 percent of a condensation product formed by condensing about 4 moles of ethylene oxide with one mole of sorbitan monostearate, and correspondingly about 60 to 40 percent of a condensation product formed by condensing about 20 moles of ethylene oxide with one mole of sorbitan tristearate.

6. A method for improving the heat-sealing, nonfogging and antistatic properties of polystyrene film which comprises coating the film with a thin coating comprising a nonvolatile portion (A) containing on a dry basis (1) about 25 to 75 percent of a condensation product formed by condensing about 3 to 7 moles of ethylene oxide with one mole of sorbitan monostearate, and (2) about 75 to 25 percent of a condensation product having adequate polystyrene solubility to provide a heat seal strength of at least about 20 grams per square inch, formed by condensing about 18 to 22 moles of ethylene oxide with one mole of sorbitan tristearate; said nonvolatile portion (A) being dissolved in a solvent comprising a $C_5$–$C_{10}$ alkane and being present in solvent (B) in a concentration of about 1 to 2 percent of the total composition.

References Cited

UNITED STATES PATENTS

| 2,582,868 | 1/1952 | Hausmann et al. | 99—103 |
| 2,726,962 | 12/1955 | Iorio | 106—13 |
| 2,665,443 | 1/1954 | Simon et al. | 117—138.8 |
| 3,022,178 | 2/1962 | Park et al. | 106—13 |
| 3,070,462 | 12/1962 | McConnell et al. | 117—138.8 |
| 3,222,191 | 12/1965 | Steiner et al. | 99—171 |

JULIUS FROME, *Primary Examiner.*

L. B. HAYES, *Assistant Examiner.*

U.S. Cl. X.R.

106—13, 243; 117—138.8, 167